United States Patent
Neuhaus et al.

(12) 
(10) Patent No.: US 6,397,891 B1
(45) Date of Patent: Jun. 4, 2002

(54) HYDRAULIC VALVE, IN PARTICULAR, ADJUSTABLE PRESSURE CONTROL VALVE

(75) Inventors: Rolf Neuhaus, Lohr/Main; Bernd Urlaub, Steinfeld; Friedrich Zapf; Liebhart Zaiser, both of Karlstadt, all of (DE)

(73) Assignee: Hydraulik Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/636,629

(22) Filed: Aug. 11, 2000

(30) Foreign Application Priority Data

Aug. 11, 1999 (DE) .......................... 199 37 969

(51) Int. Cl.⁷ ...................... F15B 13/044; F16K 31/06
(52) U.S. Cl. ................. 137/625.65; 251/129.08
(58) Field of Search ................ 137/625.65; 251/129.08

(56) References Cited

U.S. PATENT DOCUMENTS

| | | | |
|---|---|---|---|
| 4,250,922 A | * 2/1981 | Will et al. | 137/625.65 |
| 4,947,893 A | * 8/1990 | Miller et al. | 137/625.65 |
| 5,006,901 A | * 4/1991 | Dick | 137/625.65 X |
| 5,853,028 A | * 12/1998 | Ness et al. | 137/625.65 |

FOREIGN PATENT DOCUMENTS

DE    41 22 376 C2    1/1993
DE    198 10 241 A1    9/1999

* cited by examiner

*Primary Examiner*—Gerald A. Michalsky
(74) *Attorney, Agent, or Firm*—Gudrun E. Huckett

(57) ABSTRACT

A hydraulic control valve has a solenoid with a coil having an interior. The solenoid also has a pole shoe inserted partially into the interior of the coil, wherein the interior of the coil defines an armature chamber and wherein the pole shoe delimits the armature chamber axially. The solenoid also has an armature arranged in the armature chamber and moveable in the armature chamber relative to the coil. The solenoid further has an armature plunger connected to the armature, wherein the pole shoe has a central bore and wherein the armature plunger is received in the central bore and penetrates the pole shoe. A hydraulic part with a valve housing formed as a mounting bushing and resting against the pole shoe is provided. The valve housing has an axial valve bore. The hydraulic part also has a low pressure area surrounding the valve housing, wherein the valve housing has at least one radial bore connecting the axial valve bore with the low pressure area. The hydraulic part has a valve slide slidably arranged in the valve bore and configured to be moved by the armature via the armature plunger. Between the pole shoe and the valve housing a fluid chamber is formed, wherein the fluid chamber has a fluid connection with the armature chamber and with the low pressure area. The fluid connection is located external to the at least one radial bore.

13 Claims, 1 Drawing Sheet

US 6,397,891 B1

HYDRAULIC VALVE, IN PARTICULAR, ADJUSTABLE PRESSURE CONTROL VALVE

BACKGROUND OF THE INVENTION

1. Field of the Invention

The invention relates to a hydraulic valve that is embodied, in particular, as an (proportionally) adjustable pressure control valve. The hydraulic valve comprises a solenoid with a coil and a movable armature, which is located in an armature chamber which is surrounded by the coil and axially delimited by a pole shoe projecting into the coil and which is connected to an armature plunger which penetrates a central bore of the pole shoe. The hydraulic valve also comprises a hydraulic part comprising a valve housing formed as a mounting bushing which rests axially against the pole shoe and has an axially extending valve bore which is connected by at least one radial bore with a low pressure area surrounding the valve housing. The hydraulic part comprises a valve slide positioned in the valve bore and axially movable by the armature via the armature plunger, wherein a fluid chamber is formed between the pole shoe and the valve housing from which an open fluid connection extends, on the one hand, to the armature chamber and, on the other hand, to the low pressure area surrounding the valve housing.

2. Description of the Related Art

A pressure control valve with a solenoid and with a hydraulic part, comprising a valve housing formed as a mounting bushing and having an axially extending valve bore and a valve slide axially moveably positioned in the valve bore, is known from, for example, German patent document DE 41 22 376 C2. The valve bore is connected at three axially spaced apart locations via radial bores with the outer area of the valve housing. Closest to the solenoid is a low pressure area via which the pressure medium can flow out to a tank. Farthest from the solenoid is a high-pressure area to which pressure medium is supplied from a pressure medium source. Between the two aforementioned areas, the control pressure area is located in which the valve controls a pressure whose level depends on the level of the current flowing through the coil of the solenoid. The control pressure acts actually on an active surface of the valve slide in the sense of a connection of the control pressure area with the low pressure area and increases to such a value where a balance of the forces acting on the valve slide and generated by the solenoid, the control pressure, and, as the case may be, a spring optionally present in the arrangement is reached.

The pressure control valve shown in DE 41 22 376 C2 is one with an increasing characteristic line. This means that the control pressure increases with increasing strength of the current flowing through the coil of the solenoid. With such a pressure control valve the force generated by the control pressure and the force generated by the solenoid act in opposite directions on the valve slide. One end face of the valve slide and the hollow chambers of the solenoid are connected by a fluid connection with the low pressure area. This fluid connection is realized by an axial bore which is provided eccentrically to the valve bore in the valve housing and opens into one of the radial bores which extend between the valve bore and the low pressure area provided externally on the valve housing.

SUMMARY OF THE INVENTION

It is an object of the present invention to further develop a hydraulic valve of the aforementioned kind such that the pressure forces acting on the valve slide depend, if at all, only minimally on whether and how pressure medium flows through the valve.

In accordance with the present invention, this is achieved in that for a hydraulic valve of the aforementioned kind the fluid connection between the fluid chamber, which is positioned between the pole shoe and the valve housing, and the low pressure area is external to a radial bore which is positioned in a fluid connection between the valve bore and the low pressure area. In the hydraulic valve according to the invention the change of the static pressure in the pressure medium, which results from the change of the pressure medium flow, has only a very minimal effect on the pressure present on the one end face of the valve slide and in the hollow spaces (chambers) of the solenoid. Accordingly, the force level at which a force balance is reached on the valve slide depends little on whether pressure medium flows from the valve bore to the low pressure area external to the valve housing or not. When the hydraulic valve is a pressure control valve, the control pressure is very precisely maintained. In general, the hollow spaces (chambers) in the solenoid and the space or chamber in front of one of the end faces of the valve slide are not directly coupled to the pressure medium flow occurring within the radial bore in which dirt particles may be present so that with the embodiment of a hydraulic valve according to the invention soiling of the aforementioned spaces (chambers) can be prevented and a long service life of the hydraulic valve can thus be ensured.

It is especially advantageous when the pressure medium flows out at a certain location of the circumference from the low pressure area in the form of a peripheral channel and a radial compensation bore, which is positioned in the fluid connection between the fluid chamber and the low pressure area, opens opposite to the outflow location into the low pressure area. Opposite the outflow location the effect of the flowing pressure medium on the static pressure can be maintained at an especially minimal level. Especially preferred is an embodiment with an odd number of uniformly circumferentially distributed radial outflow bores between the low pressure area and the valve bore, wherein one of these radial outflow bores is aligned with the outflow location and the radial compensation bore is positioned opposite to this radial outflow bore. In particular, the radial compensation bore opens into the peripheral channel at a location where no pressure medium flows so that the opening of the radial compensation bore is not subjected to pressure medium flow which permanently conveys dirt particles from the hydraulic circuit which could reach the dead spaces of the flow in the solenoid and a location in front of the end face of the valve slide.

According to another preferred embodiment, the armature plunger in the pole shoe is seal-tightly and slidingly guided in the pole shoe, and an axial bore of the armature plunger is positioned in the fluid connection between the fluid chamber and the armature chamber in the solenoid, wherein the axial bore is open at the end face of the armature plunger positioned within the anchor chamber. In this manner, the channel between the fluid chamber and the armature chamber is very long. The compensation for the increase or decrease of the free volume of the armature chamber by inflow or outflow of pressure medium into or out of the armature chamber as a result of the movement of the armature results in a displacement of the pressure medium column only within the channel between the armature chamber and the fluid chamber so that the armature chamber is effectively protected against soiling. The fluid connection between the two partial armature chambers on both end faces of the armature is realized in an advantageous manner by at least one channel between the armature and the portion of the armature plunger inserted into the armature, wherein preferably the armature plunger has a circular outer periphery and the channel is formed by a deviation of the cross-section of the central throughbore in the armature from a circular shape. The channel preferably extends axially.

In a pressure control valve the force balance acting on the valve slide is not only affected by the low pressure acting on the one end face of the valve slide but also by the control pressure present at the other end face. According to another preferred embodiment, in which the hydraulic valve is a pressure control valve which is proportionally adjustable by a solenoid and which comprises a valve housing embodied as a mounting bushing having an axially extending valve bore which is connected by at least one radial bore, respectively, with a peripheral outer high-pressure area or chamber, a peripheral outer low pressure area or chamber, and a peripheral control pressure area or chamber positioned axially between the high pressure chamber and the low pressure chamber, wherein a valve slide is positioned in the valve bore and is loadable in the sense of a connection of the control pressure chamber with the high-pressure chamber via a solenoid force and in the sense of a connection of the control pressure chamber with the low pressure chamber by the control pressure, the control pressure present at the one end face of the valve slide is affected especially minimally by the pressure medium flow when a fluid path between the control pressure chamber and a pressure chamber positioned in front of the one end face of the valve slide is positioned external to the radial bores connecting the control pressure chamber and the valve bore. With respect to the control pressure chamber and the pressure chamber at the one end face of the valve slide the same principle is applied as with the low pressure chamber and the other end face of the valve slide.

It should be mentioned in this context that the effect of a pressure medium flow onto the force balance on the valve slide can be reduced already by the mere application of the features disclosed in the preceding paragraph so that, in principle, an embodiment without realizing a fluid connection between the fluid chamber and the low pressure chamber external to the radial bore, which provides a fluid connection between the valve bore and the low pressure area, is possible.

The fluid path comprises an axial blind bore which opens at the end face of the valve housing and a radial bore open toward the control pressure chamber and connected with the axial bore and positioned so as to end at a spacing to the valve bore. Preferably, the control pressure area, at least after mounting of the valve housing in a mounting or receiving bore, has a certain outflow and inflow location and the radial bore of the fluid path opens opposite to the outflow location into the control pressure area.

An odd number of radial bores uniformly circumferentially distributed in the valve housing extend between the control pressure area and the valve bore, wherein one of these radial bores is aligned with the outflow location and the radial bore of the fluid path is positioned opposite to this radial bore.

DESCRIPTION OF THE PREFERRED EMBODIMENTS

Figure 1:
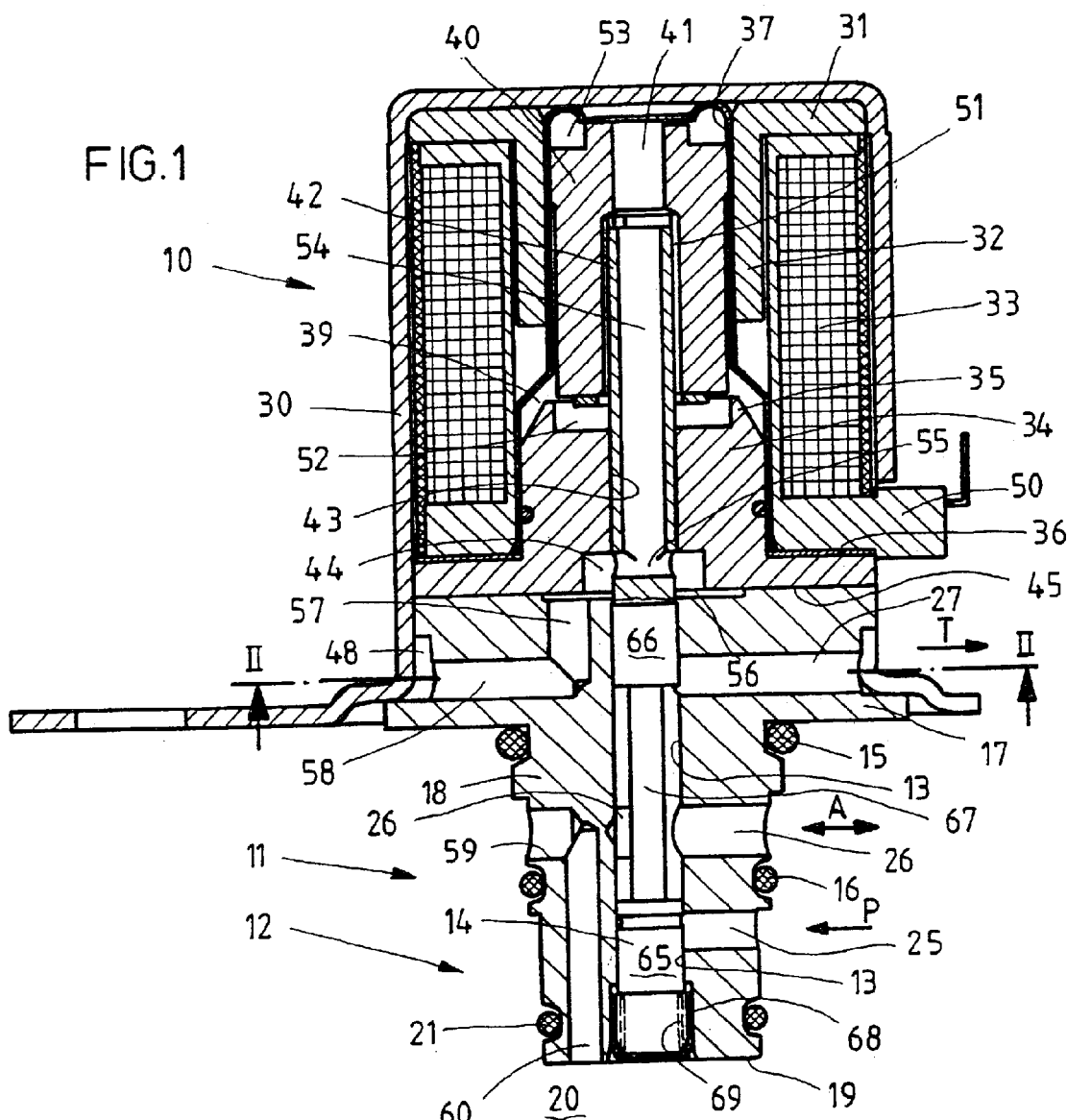
FIG. 1 is an axial longitudinal section along the axis of the valve bore and the solenoid of one embodiment according to the invention.

The illustrated hydraulic pressure control valve comprises a solenoid 10 and a hydraulic part 11. The latter is comprised essentially of a valve housing 12, having radial symmetry and being formed as a collar bushing and having centrally an axial throughbore (valve bore) 13, and is further comprised of a valve slide 14 which is guided axially moveably in the axial valve bore 13. Radially outside on the valve housing 12 three pressure areas P, A, and T can be identified which are sealed relative to one another by two O-rings 15 and 16, positioned in circumferential grooves, in cooperation with a wall of a receiving bore (the receiving bore of a device in which the hydraulic valve is mounted is not shown). The pressure area T is provided externally on a widened disc-shaped portion 17 of the valve housing 12. The pressure medium flows from this area T back to a reservoir. This pressure area T is therefore referred to as low pressure area. The two pressure areas or chambers A and P are positioned on a sleeve-shaped portion 18 of the valve housing 12. Pressure medium flows from a pressure medium source under pressure to the pressure area P. This area P is therefore referred to as high pressure area. In the pressure area A, which is located axially between the low pressure area T and the high pressure area P, the control pressure is adjusted. The pressure area A is therefore referred to in the following as the control pressure area. The space or chamber 20 in front of the free end face 19 of the housing portion 18, including a portion of the axial valve bore 13 widening in a direction away from the end face 19, is separated by a further O-ring 21 surrounding the valve housing 12 from the high-pressure area P so as to prevent fluid communication.

Three radial bores 25 or 26 or 27, respectively, extend between each pressure area P, A, and T and the axial valve bore 13. The three radial bores connecting each one of the pressure areas P, A, and T with the axial bore 13, respectively, are positioned with the same angular spacing to one another about the circumference of the valve housing 12, i.e., they have an angular spacing of 120° relative to one another.

The solenoid 10 comprises a deepdrawn cup-shaped sheet metal housing 30. A first pole shoe 31 is placed onto the bottom of the housing 30 which rests with a flange-like portion axially and radially against the sheet metal housing 30 and projects with a tubular portion 32 into the solenoid coil 33, also inserted into the sheet metal housing 30, approximately to half the height of the coil 33. From the other side a second pole shoe 34 projects into the solenoid coil 33. It also rests with a flange-like portion radially inwardly against the sheet metal housing 30. The pole shoe 34 has a cone 35 facing the other pole shoe 31 as is characteristic for proportional solenoids in which the magnetic force is essentially independent of the stroke and depends only on the level of the current flowing through the coil of the solenoid. A corrugated washer 36 is positioned axially between the flange-like portion of the pole shoe 34 and the solenoid coil 33 for compensating axial play between the parts 31, 33, and 34. A bushing 37 comprised of a non-magnetic sheet metal surrounds the portion of the pole shoe 34 projecting into the solenoid coil 33, tapers in front of the cone 35, and is inserted into the pole shoe 31.

The armature chamber 39 surrounded by the bushing 37 and the pole shoe 34 receives the armature 40 through which a central stepped throughbore 41 extends whose portion with the greater diameter is open toward the pole shoe 34 and whose portion with the smaller diameter is open toward the bottom of the sheet metal housing 30. An armature plunger 42 is inserted into the bore portion having the greater diameter and the insertion length is approximately two-thirds of the axial extension of the armature 40. The end face of the armature plunger 42 facing the bottom of the sheet metal housing 30 is positioned at a small spacing from the step between the two bore portions. The armature plunger 42 is seal-tightly and slidingly guided in a central bearing bore 43 of the pole shoe 34 and projects into a central cutout 44 which is provided in the end face 45 of the pole shoe 34 facing away from the armature chamber 39. The end of the armature plunger 42 remote from the armature 40 is machined over a certain length externally to a size which is smaller than the diameter of the valve bore 13. The armature plunger 42 can therefore be immersed into the valve bore 13 the valve housing 12, resting axially against the pole shoe 34, without the risk of impact.

The sheet metal housing 30 of the solenoid 10 projects past the pole shoe 34 forming a receptacle for an end of the valve housing 12 opposite the end face 19 and surrounds the disk-shaped portion 17 of the valve housing 12. In this disc-shaped portion 17 an annular groove or channel 48 extends peripherally which is covered, with the exception of a limited angular area, by the sheet metal housing 30 so that between the disk-shaped portion 17 and the sheet metal housing 30 of the solenoid 10 an annular channel is formed which is closed in cross-section and which is radially outwardly open at a certain location. At this location the sheet metal housing 30 is provided with a cutout 49 which not only serves to allow pressure medium to flow out of the annular channel 48 but also to allow an electrical connecting part 50 to project radially outwardly from the interior of the sheet metal housing 30. Especially in FIG. 2 it can be seen that one of the radial bores 27, which connect the annular channel 48 belonging to the low pressure area T to the axial bore, exits precisely at the outflow location 49 to the exterior. The arrangement is similar for the control pressure area A. In an extension of the radial bore 26 shown in FIG. 1 the pressure medium flows away from the control pressure area A or toward the control pressure area A.

In the wall of the portion with the greater cross-section of the bore 41 of the armature 40 several longitudinal grooves 51 are provided via which the two partial armature chambers 52 and 53, located in front of the end faces of the armature 40, are in fluid communication with one another externally along the armature plunger 42, wherein this fluid path includes the smaller portion of the bore 41. Moreover, the entire armature chamber 39 is open with regard to fluid communication toward the low pressure area T. This open connection is initially realized in the form of an axial bore 54 which is provided in the armature plunger 42 starting at the end face facing the bottom of the sheet metal housing 30 and which extends to a location shortly before the other end face. By means of a transverse bore 55 the axial bore 54, in any position of the armature plunger 42, is open toward the cutout 44. In the end face of the valve housing 12 facing the pole shoe 34 an open depression 56 is provided in the pole shoe 34 which is concentric to the cutout 44 and is not as deep as the cutout 44 but has a greater diameter. The cutout 44 and the depression 56 together form a fluid chamber. An axial blind compensation bore 57 extending parallel to the valve bore 13 opens into this depression 56 and has a transition at its end into a radial blind compensation bore 58 located in the plane of the three radial bores 27 and open to the annular channel 48 but closed to the valve bore 13. As can be seen especially clearly in FIG. 2, the radial bore 58 opens into the annular channel 48 at a location exactly opposite the outflow location 49 of the pressure medium from the annular channel 48. Moreover, the radial bore 58 is positioned precisely between two of the radial bores 27. At the location where the radial bore 58 opens into the annular channel 48 there is practically no pressure medium flow which could be traced back to the outflow of pressure medium from the control pressure area A to the low pressure area T.

Similar to the low pressure area T, a blind bore 59 is positioned opposite the radial bore 26 within the control pressure area A and is open to the control pressure area A but is closed to the valve bore 13. An axial blind bore 60 opens into the radial bore 59 and extends away from the end face 19 of the valve housing 20 so that via the bores 59 and 60 a fluid connection from the control pressure area A to the space (chamber) 20 is provided.

The valve slide 14 has two slide collars 65 and 66 whose clearance in the axial direction from one another is identical to the axial clearance of the radial bores 25 from the radial bores 27. They are connected by a piston rod 67 whose diameter is significantly smaller than the diameter of the valve bore 13. The valve slide 14 is loaded in the sense of a fluid connection between the control pressure area A and the low pressure area T by a weak pressure spring 69 secured in a cage 68 and also by the control pressure present in the space or chamber 20. In the opposite direction and in the sense of a connection of the control pressure area A with the high pressure area P a magnetic force acts onto the valve slide 14 which is exerted by the solenoid armature 40 via the armature plunger 42.

Figure 2:
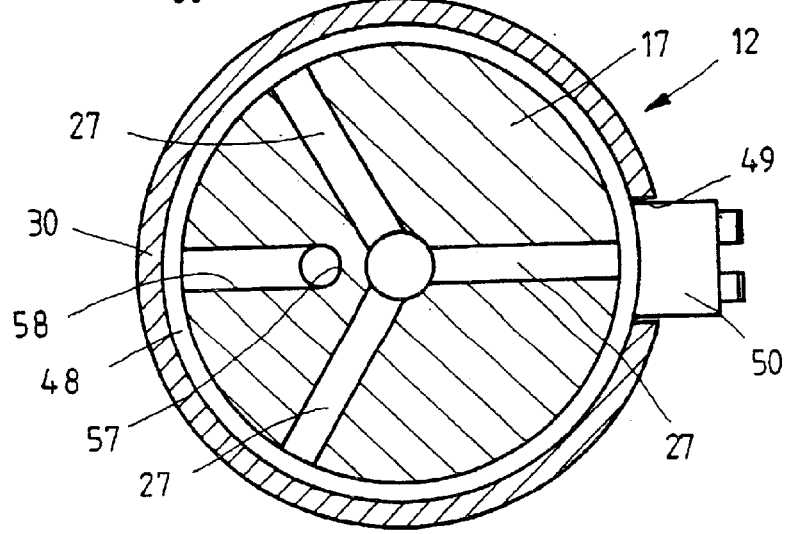
FIG. 2 is a section along the line II—II of FIG. 1.

In FIG. 1, the valve is shown in a state in which the solenoid is not excited and exerts no force on the valve slide 14. The control pressure area A is in fluid connection between the low pressure area T. The solenoid armature 40 is positioned at the bottom of the bushing 37 with its greatest axial spacing from the pole shoe 34. When now the current is applied to the coil of the solenoid, the armature 40 moves toward the pole shoe 34 and thus moves the valve slide 14 against the force of the pressure spring 69 and provides a fluid connection between the control pressure area A and the high-pressure area P. During the movement of the armature 40 the free volume in the armature chamber 39 increases because the armature plunger 42 moves partially out of the armature chamber 39. The increase of the free armature chamber volume is compensated by flow of pressure medium from the annular channel 48 via the axial bore 54 and the transverse bore 55 in the armature plunger 42, via the space (cutout) 44, the space (depression) 56, as well as via the bores 57, 58. However, in this context the increase of free armature chamber volume is not so large that the pressure medium which has previously been in the annular channel 48 could now enter the armature chamber 39. Only a displacement of the liquid column within the aforementioned liquid path takes place. In this connection, the volume of the bores 57, 58 is already greater than the compensation volume so that no pressure medium must flow from the annular channel 48 into the spaces 44 and 56 defining the fluid chamber so that not only the armature chamber 39 and thus the bearing location between the armature 40 and the bushing 37 but also the bearing bore 43 and thus the support of the armature plunger 42 in the pole shoe 34 are protected against soiling.

Upon connecting the control pressure area A with the high pressure area P the pressure in the control pressure area A and in the space 20 increases so that the force acting on the valve slide 14 counter to the solenoid force increases and finally moves the valve slide 14 in the direction toward the pole shoe 34 until the radial bores 25 are closed by the slide collar 65. By opening the control pressure area A toward the low pressure area or toward the high pressure area with small movements of the valve slide 14 within the control pressure area, a pressure corresponding to the solenoid force is maintained. Once the solenoid is separated from the electric circuit, the valve slide 14 is then moved by the pressure spring 69 again into the position illustrated in FIG. 1. During the return movement of the valve slide 14, the free volume in the anchor chamber 39 decreases. Accordingly, pressure medium must be displaced from the armature chamber 39 via the bores in the armature plunger 42, the spaces (fluid chamber) 44 and 56, as well as the bores 57 and 58, wherein in this context also only a displacement of the liquid column takes place.

While specific embodiments of the invention have been shown and described in detail to illustrate the inventive principles, it will be understood that the invention may be embodied otherwise without departing from such principles.

What is claimed is:

1. A hydraulic control valve comprising:
   a solenoid (10) comprising a coil (33) having an interior;
   said solenoid (10) further comprising a pole shoe (34) inserted partially into said interior of said coil (10), wherein said interior of said coil (10) defines an armature chamber (39) and wherein said pole shoe (34) delimits said armature chamber (39) axially;
   said solenoid (10) further comprising an armature (40) arranged in said armature chamber (39) and moveable in said armature chamber (39) relative to said coil (33);
   said solenoid (10) further comprising an armature plunger (42) connected to said armature (40), wherein said pole shoe (34) has a central bore (43) and wherein said armature plunger (42) is received in said central bore (43) and penetrates said pole shoe (34);
   a hydraulic part (11) comprising a valve housing (12) formed as a mounting bushing and resting against said pole shoe (34);
   said valve housing (12) having an axial valve bore (13);
   said hydraulic part (11) having a low pressure area (T) surrounding said valve housing (12), wherein said valve housing (12) has at least one radial bore (27) connecting said axial valve bore (13) with said low pressure area (T);
   said hydraulic part (11) having a valve slide (14) slidably arranged in said valve bore (1) and configured to be moved by said armature (40) via said armature plunger (42);
   wherein between said pole shoe (34) and said valve housing (12) a fluid chamber (44, 56) is formed, wherein said fluid chamber (44, 56) has a fluid connection with said armature chamber (39) and with said low pressure area (T);
   wherein said fluid connection is located external to said at least one radial bore (27).

2. The hydraulic valve according to claim 1, wherein said hydraulic valve is a proportionally adjustable valve.

3. The hydraulic valve according to claim 1, wherein said fluid connection is comprised of an axial blind compensation bore (57) open toward said fluid chamber (44, 56) and a radial compensation bore (58) open toward said low pressure area (T) and connected to said axial blind compensation bore (57), wherein said radial compensation bore (58) ends at a spacing from said valve bore (13).

4. The hydraulic valve according to claim 3, wherein said low pressure area (T) is a circumferentially extending channel (48) formed when said hydraulic part (11) is mounted in a receptacle of said solenoid (10) and having an outflow location (49), wherein said radial compensation bore (58) opens into said circumferentially extending channel (48) opposite said outflow location (49).

5. The hydraulic valve according to claim 4, wherein an odd number of said radial bores (27) are distributed uniformly in a circumferential direction of said valve housing (12), wherein one of said radial bores (27) is aligned with said outflow location (49) and is positioned opposite said radial compensation bore (58).

6. The hydraulic valve according to claim 4, wherein said valve housing (12) has a disk-shaped portion (17) and wherein said solenoid (10) comprises a cup-shaped sheet metal housing (30) comprising said receptacle for said valve housing (12), wherein said disk-shaped portion (17) has an annular peripheral groove (48), wherein, when said disk-shaped portion (17) is received in said receptacle, said annular peripheral groove (48) is covered by said cup-shaped housing (30) and forms said circumferentially extending channel (48), wherein said receptacle of said cup-shaped housing (30) has a cutout forming said outflow location (49).

7. The hydraulic valve according to claim 1, wherein said armature (40) has a central throughbore (41) and wherein said armature plunger (42) is secured in said central throughbore (41) and is guided seal-tightly and slidingly in said pole shoe (34), wherein said armature plunger (42) comprises an axial plunger bore (54) and wherein said axial plunger bore (54) forms a part of said fluid connection between said fluid chamber (44, 56) and said armature chamber (39), wherein said axial plunger bore (54) is open at an end face of said armature plunger (42) located in said armature chamber (39), wherein said armature chamber (39) comprises two partial chambers (52, 53) located at opposite end faces of said armature (40) and wherein said two partial chambers (52, 53) are in fluid connection via said axial plunger bore (54).

8. The hydraulic valve according to claim 7, wherein between said armature (40) and a portion of said armature plunger (42) inserted into said armature (40) at least one channel (51) is formed and wherein said two partial chambers (52, 53) are in fluid connection via said at least one channel (51).

9. The hydraulic valve according to claim 8, wherein said armature plunger (42) has a circular periphery and wherein said central throughbore (41) of said armature (40) has a deviation from a circular cross-section and wherein said deviation forms said at least one channel (51).

10. The hydraulic valve according to claim 8, wherein said at least one channel (51) extends axially.

11. A hydraulic valve comprising;
    a valve housing (12) formed as a mounting bushing and having an axial valve bore (13);
    a solenoid (10) connected to a first end of said valve housing (12) and configured to proportionally adjust said hydraulic valve;
    said valve housing (12) having an outer peripheral high pressure chamber (P), an outer peripheral low pressure chamber (T), and an outer peripheral control pressure chamber (A) axially positioned between said outer peripheral high pressure chamber (P) and said outer peripheral low pressure chamber (T);
    said valve housing (12) having at least one first radial bore (25) connecting said outer peripheral high pressure chamber (P) to said axial valve bore (13), at least one second radial bore (27) connecting said outer peripheral low pressure chamber (T) to said axial valve bore (13), and at least one third radial bore (26) connecting said outer peripheral control pressure chamber (A) to said axial valve bore (13);

a valve slide (14) slidably arranged in said valve bore (13) and having a first end facing said solenoid (10) and a second end remote from said solenoid (10), wherein said valve slide (14) is configured to be moved in a first direction by a magnetic force to connect said outer peripheral control pressure chamber (A) with said outer peripheral high pressure chamber (P) and configured to be moved in a second direction by a control pressure to connect said outer peripheral control pressure chamber (A) with said outer peripheral low pressure chamber (T);

a pressure chamber (20) positioned at a second end of said valve housing (12) remote from said solenoid (10) in front of said second end of said valve slide (14);

a fluid path (59, 60) positioned external to said at least one third radial bore (26) and configured to connect said outer peripheral control pressure chamber (A) with said pressure chamber (20) at said second end of said valve housing (12);

wherein said fluid path (59, 60) comprises an axial blind bore (60) open toward said pressure chamber (20) at said second end of said valve housing (12) and a fourth radial bore (59) open toward said outer peripheral control pressure chamber (A) and connected to said axial blind bore (60), wherein said fourth radial bore (59) ends at a spacing from said axial valve bore (13).

12. The hydraulic valve according to claim 11, wherein said outer peripheral control pressure chamber (A) has a defined inflow and outflow location at least when mounted in a receiving bore, wherein said fourth radial bore (59) opens into said outer peripheral control pressure chamber (A) opposite said inflow and outflow location.

13. The hydraulic valve according to claim 12, wherein an odd number of said third radial bores (26) are distributed uniformly in a circumferential direction of said valve housing (12), wherein one of said third radial bores (26) is aligned with said inflow and outflow location and is positioned opposite said fourth radial bore (59).

* * * * *